Nov. 19, 1935.  H. E. ANDERSON  2,021,279
BRAKE BEAM SUPPORT
Filed April 14, 1933   3 Sheets-Sheet 3
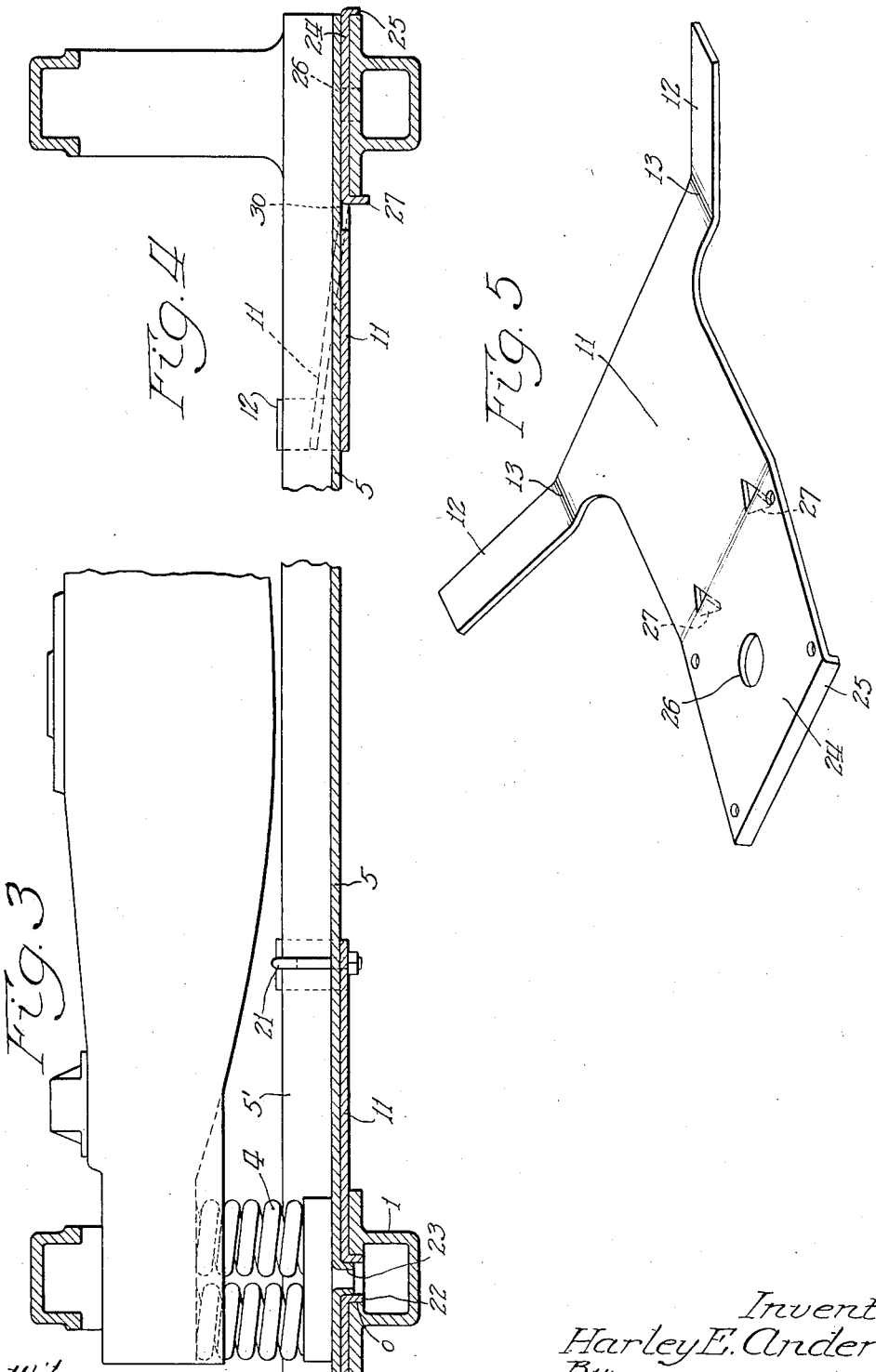

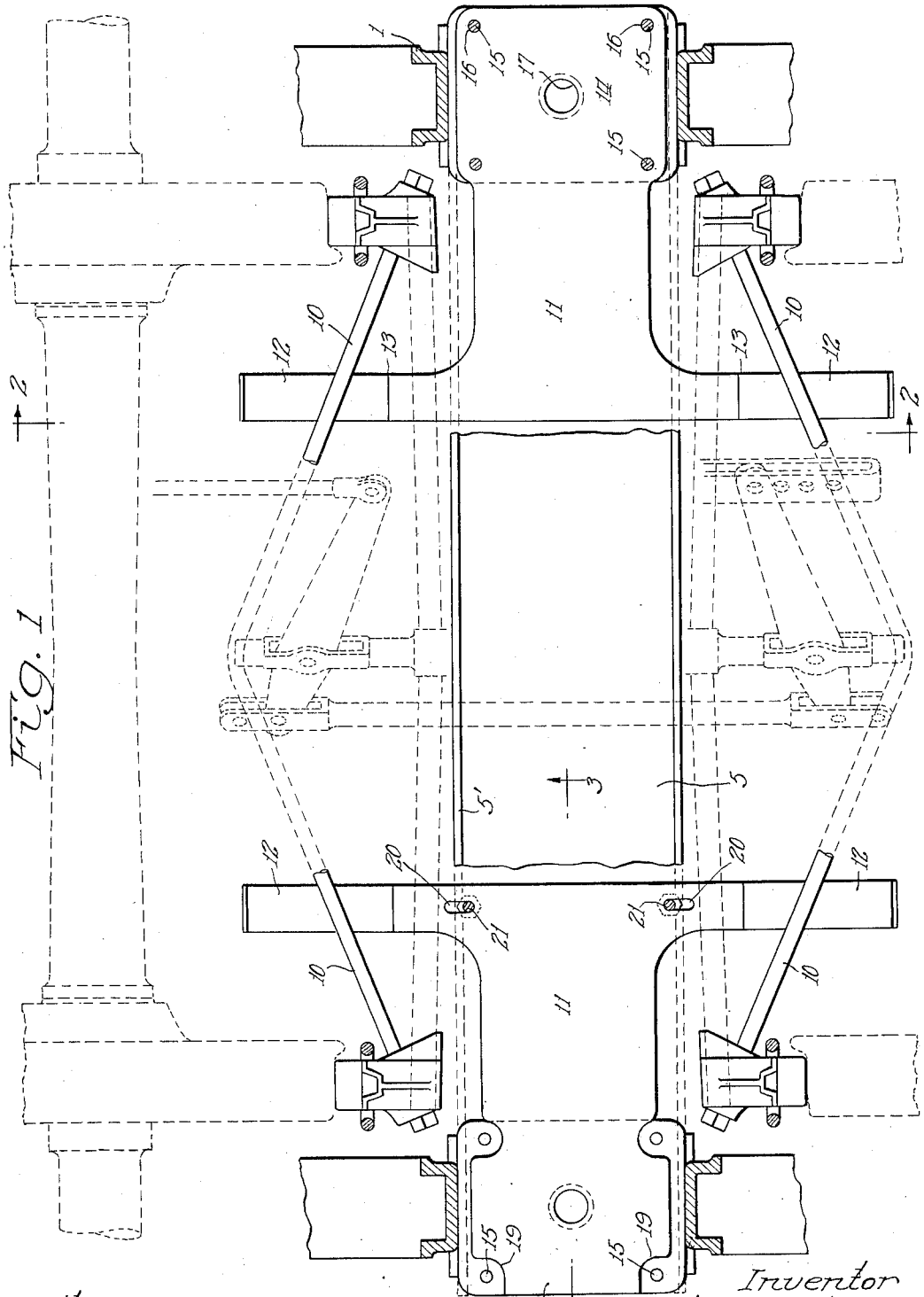

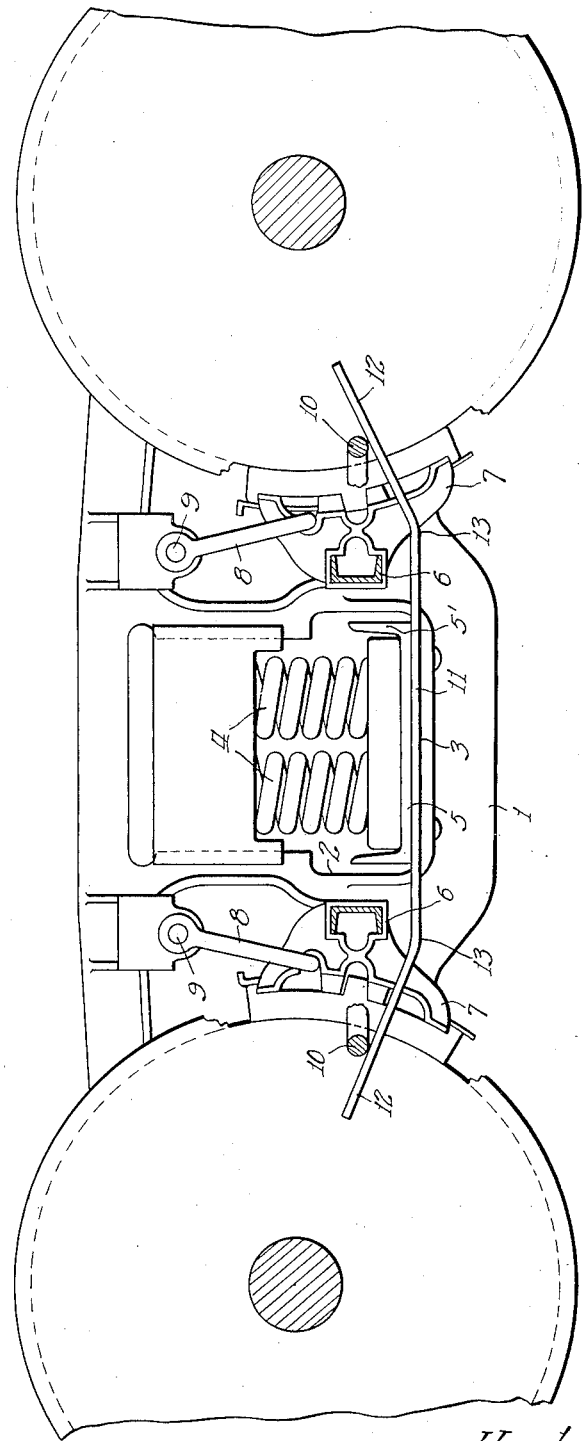

Patented Nov. 19, 1935

2,021,279

UNITED STATES PATENT OFFICE 2,021,279

BRAKE BEAM SUPPORT

Harley E. Anderson, Chicago, Ill., assignor to John H. Sharp, Chicago, Ill.

Application April 14, 1933, Serial No. 666,150

8 Claims. (Cl. 188—210)

My invention relates to car constructions and more particularly to brake beam supports adapted to support and level the beams mounted on railway car trucks. It is now required that all freight cars receiving general repairs and all new equipment built after the American Railroad Association ruling must be equipped with suitable brake beam safety supports. This requirement comes from the known fact that many wrecks occur resulting from brake hanger or brake pin failures allowing the brake beams to drop on the tracks and cause derailment, thereby causing loss and damage.

The present invention has among its objects the production of a practical, inexpensive and efficient brake beam support which will fulfill all requirements and in addition will safely support a brake beam in its horizontal position and which does not depend upon rivets or bolts to attach or support the same in operative position. It is well known to those skilled in the art that any support that is attached to the truck or to any part of the truck with rivets, bolts or like securing means alone will be subject to excessive wear on the rivets or bolts because the dead weight of said supports soon causes the heads of the rivets or bolts to wear off due to the continued vibration of the truck to which they are attached. The supports being located and carried by the parts not supported by the truck springs, the effects of constant vibration must be seriously considered since these parts receive the shock or hammer blows transmitted directly from the rails to the beam supports through the wheels. It is found that by the time the primary brake hanger is worn in service to an extent where it may fail, that the safety supports are also worn to an equal or greater extent due to the fact that they are not favored with the spring action of the truck springs.

A still further and important object of my invention is to furnish a brake beam support that can be easily applied to a truck construction of existing equipment without requiring truck reconstruction or removing the truck from the car or dismantling the truck. With my construction, the device is simple to apply, as all that is necessary is to raise the spring plank with a jack, just enough to allow the brake beam support to slip in between the spring plank and the truck side frame, slip the device in place and then remove the jack and let the weight of the car body and its load rest upon the brake beam support holding it firmly in place.

A still further object of the invention is the simplicity of the construction of the device and the inexpensive manufacturing costs thereof, as the same may be economically stamped from standard stock sizes of sheet steel with the elimination of manufacturing waste and accessory parts and installation costs of castings, pins, bolts and rivets.

And as a further advantage, it may be mentioned that the devices may be nested or stacked for storing or shipping, thereby providing for economy in space and handling.

Many other objects and advantages of the construction herein shown and described will be obvious to those skilled in the art from the disclosure herein given.

To this end, my invention consists in the novel construction, arrangement and combination of parts herein shown and described, and more particularly pointed out in the claims.

In the drawings, wherein like reference characters indicate like or corresponding parts:

Fig. 1 is a sectional plan view of a standard truck, two forms of the device being shown in this figure, one form at the right hand side and the other at the left hand side;

Fig. 2 is a vertical sectional view taken substantially on line 2—2 of Fig. 1;

Fig. 3 is a vertical sectional view taken substantially on line 3—3 of Fig. 1.

Fig. 4 is a similar view illustrating a modified construction; and

Fig. 5 is a perspective view of a support embodying some of the features shown in Fig. 4.

Referring to the drawings, I have shown a conventional truck and brake construction so as to illustrate the application of the device to a car construction. As shown, I represents a truck side frame provided with the usual spring opening 2 and spring seat 3, 4 representing the springs which may be employed in the construction. The truck includes two similar truck side frames I connected with the usual spring plank 5 which may be secured to the side frame by bolts, rivets, or the equivalent, or by an interengagement of the side frame and spring plank which is common practice. As shown in Fig. 2, 6 represents the brake beams, 7 the brake shoes and 8 the brake hangers which are pivoted as at 9 from the truck frame, 10 being the usual tension members forming a part of the brake beam construction. The particular construction illustrated is typical, it being understood that my improved support is applicable for use on practically every type of truck construction.

My improved support consists of a body plate 11 of the proper gauge steel provided with the arms or extending parts 12 at each side, the whole somewhat resembling a T, the arms being preferably bent at 13 so as to extend at a slight angle to the body of the plate. When the brakes are in released position, the brake beam is supported so that the shoes are not in contact with the wheels. The arms 12 obviously are resilient or slightly yieldable. The supported opposite or outer end of the plate is of a width so that it may be inserted into the spring opening 2 in the side frame. It may be mentioned that while I have shown several forms of the device, they are all the same in the essential details, each one consisting of the body portion 11 with the arms 12, the opposite end of each one being of a size to fit into the spring opening and be carried by the side frame and be primarily maintained in place by the weight of the car body or superstructure and lading carried by the truck side frames.

Referring first to the support shown at the right hand of Fig. 1, 11 represents the plate with the end 14 extended into the opening 2 of the side frame and underlying the spring plank 5, the plank being partially cut away in Fig. 1 so as to show the support. If the spring plank is bolted, riveted or otherwise secured to the side frame by rivets 15, or the equivalent, the end 14 is provided with openings 16 or otherwise constructed so as not to interfere with the rivets. The same may also be provided with an opening 17 so as to register with an opening in the frame should the spring plank be provided with a lug or boss having engagement with the truck frame. It should be noted that in some constructions, the spring plank may be bolted or secured to the truck frame while in other instances, there is an interlocking engagement between the two which prevents relative movement of the truck side frames toward or from each other.

At the left-hand side of Fig. 1, the plate 11 is provided with the outer end 18 which, in this instance, is shown cut away as indicated at 19 so as to clear any bolts or rivets 15 if they are used. As will be seen by referring to Fig. 3, the side frame 1 in this construction is provided with an opening O and the spring plank 5 with a downturned boss 23, it being generally standard practice to merely form a boss on the underside of the spring plank which fits into a cored opening in the truck side frame. When the weight of the car body is resting on the cluster of coil springs and the springs are seated on the top of the spring plank or spring seat thereon, the truck frames are held together more satisfactorily than with rivets or bolts. In this particular instance, I have shown the end 18 of the beam support formed with a boss 22 which will project into the cored opening in the frame and also receive the boss 23 on the spring plank. Obviously, however, the end 18 may be provided with an opening corresponding in size with the opening in the side frame so that the boss on the spring plank may project through the member and directly engage with the side frame. This view also shows the employment of additional fastening means consisting of the members 21 which may project through the openings 20 in the member 11 as shown and engage with the flanges 5' of the spring plank. These members serve primarily to maintain the support and spring plank in close contact, thereby obviating any vibration between the two.

In Figs. 4 and 5, the support is shown with slight variations which may be incorporated in the same, if desired. As shown, the supporting member 11, in this instance, is provided with the outer end 24 which may be flanged as at 25 to engage the outer side of the side frame and, if desired, provided with the lugs 27 arranged to engage the inner side of the side frame, 26 being the hole either plain or formed with a boss as shown in the other constructions. In Fig. 4 is illustrated in dotted lines how the inner end of any of the supports shown may be given an offset or bend in the process of manufacture. When the device is applied, the weight of the car body will straighten this bend so that the sheet or plate is flat. The inner or arm end, however, will be maintained in close contact with the spring plank and vibration be prevented. Obviously, this serves the same purpose as the members 21, no extra fastening means or other parts being required.

I have previously described how the device may be installed by inserting the outer end in the opening through the side frame and securing the same in place by utilizing the weight of the car body. It will be noted that from the several forms of the device illustrated and described, each support consists of the plate or body part with the two arms preferably all formed from an integral sheet and that any one or more of the several additional features illustrated may be incorporated therein to meet individual preferences. Also, it will be obvious that the device is applicable for various car constructions and on both new equipment or for ready application on old equipment, the simple type shown at the right hand of Fig. 1 being practically universal in its application for any type of truck equipment.

Having thus described the invention, it is obvious that various immaterial modifications may be resorted to without departing from the spirit or my invention; hence I do not wish to be understood as limiting myself to the exact form, construction and arrangement shown and described, or uses mentioned.

What I claim as new and desire to secure by Letters Patent is:

1. A brake beam support consisting of a plate having a part of a size to fit between the side frame and spring plank on a car truck and extend inwardly of the car, and having laterally extending arms at opposite sides of a length to project to and underlie the brake beam.

2. A brake beam support for car trucks consisting of a substantially flat sheet metal plate for each end of the truck, each having a supporting end part of a size to fit the opening in the side frame and underlie the spring plank and secured therein, the other end extending inwardly of the car below the spring plank, and having laterally extended arms at opposite sides of a length to underlie the adjacent brake beams.

3. In a car construction of the kind described and in combination, side frames and a spring plank carried by and connecting the same, a brake beam support arranged at each end of the spring plank with a portion inserted between the under side of the plank and its bearing on the side frame, each of said supports provided with a laterally extending arm of a length to project under and beyond a brake beam adjacent thereto.

4. In a car truck construction of the kind described and in combination, side frames and a spring plank carried by and connecting the same, a brake beam support arranged at each end of the spring plank with a portion inserted between the under side of the plank and its bearing on the side frame, the supports being maintained in contact with the plank, each of said supports provided with a laterally extending resilient arm of a length to project under the brake beam adjacent thereto.

5. In a car construction of the kind described and in combination, a side frame and a spring plank resting thereon and carried thereby, a brake beam support member consisting of a plate having its outer end positioned between the spring plank and side frame and maintained therebetween by the weight of the car body carried above, and supplemental means for securing said support against displacement, said support extending inwardly of the car frame toward the center of the car and provided with arms extending longitudinally of the car under the brake beams and beyond the same.

6. In a car construction of the kind described and in combination, side frames and a member connecting the side frames and resting thereon and secured thereto, a brake beam support member consisting of a T shaped plate having its outer leg end inserted between the connecting member and side frame and maintained therebetween by the weight of the car body carried above, and supplemental means for additionally securing said support against displacement, said support extending inwardly of the car frame toward the center of the car and provided with resilient arms extending longitudinally of the car under the brake beams.

7. A brake beam support for car trucks consisting of an elongated sheet metal body part provided with a bend intermediate its ends whereby the central portion is displaced toward one face beyond the plane of the ends, and arms extending laterally at opposite sides adjacent one end of said body part.

8. A brake beam support for car trucks consisting of an elongated sheet metal body part provided with a bend intermediate its inner and outer ends whereby the central portion is displaced from the plane cutting the ends, and arms extending laterally at opposite sides adjacent the inner end of said body part, said arms also being formed to extend transversely with respect to a face of said body part and in the opposite direction to the displacement of said central portion.

HARLEY E. ANDERSON.